United States Patent [19]

Beadle

[11] Patent Number: 5,735,425
[45] Date of Patent: Apr. 7, 1998

[54] REUSABLE BEER KEG PLUG

[76] Inventor: Leigh P. Beadle, 375 1/2 Tenney Cir., Chapel Hill, N.C. 27514

[21] Appl. No.: 650,738

[22] Filed: May 20, 1996

[51] Int. Cl.⁶ ............................................. B65D 53/00
[52] U.S. Cl. ............................................. 220/235; 215/360
[58] Field of Search ................................. 220/235, 233, 220/234, 236; 215/358, 360

[56] References Cited

U.S. PATENT DOCUMENTS

| | | | |
|---|---|---|---|
| 2,566,816 | 9/1951 | Work | 220/235 X |
| 3,358,869 | 12/1967 | Palmer et al. | 220/233 |
| 3,365,093 | 1/1968 | Malenke | 220/235 |
| 3,489,312 | 1/1970 | Hunckler et al. | 220/235 |
| 3,618,809 | 11/1971 | Martino | 220/235 |
| 5,074,380 | 12/1991 | Bedi et al. | 220/235 X |

*Primary Examiner*—Stephen Cronin
*Attorney, Agent, or Firm*—Olive & Olive, P.A.

[57] ABSTRACT

An improved reusable beer keg plug replaces the conventional wooden bung and is formed of an elastomeric material as a tapered, expandable plug suited to being snugly fitted within a conventional beer keg sidewall tapered hole and thereafter expanded by an adjustable tightening device forming part of the plug.

2 Claims, 1 Drawing Sheet

REUSABLE BEER KEG PLUG

FIELD OF INVENTION

The invention relates generally to plugs for releasably sealing holes and more specifically to plugs for releasably sealing beer keg holes.

BACKGROUND ART

The typical modern barrel shaped beer keg is made of stainless steel and has an inwardly tapered hole in its sidewall which has to be plugged when not being used as a passage for the beer. Expandable plugs have been known for use in boiler tube holes of uniform diameter. However, the common way for plugging an inwardly tapered beer keg hole is to use a wooden bung and tap the wooden bung in place in the conventional tapered hole found in the beer keg. The typical wooden bung is destroyed when removed and is more likely to collect and promote the growth of bacteria than would a plug made of a food grade elastomeric material. Thus, there is a need for an improved beer keg plug and particularly one that can be expanded, reused and in a form that does not tend to develop bacteria.

SUMMARY OF THE INVENTION

The improved beer keg plug of the invention comprises an expandable plug which is formed in a tapered shape to conform to the taper of the standard beer keg hole, is made of a food grade material, has a tightening means which enables the plug to be expanded when installed so as to resist the beer keg pressure but preferably requires use of a tool in order to remove the plug. The required use of a tool minimizes the opportunity for the plug to be improperly removed and unexpectedly ejected under the influence of the internal beer keg pressure which may be as high as 20 p.s.i.

DETAILED DESCRIPTION OF THE INVENTION

Figure 1:
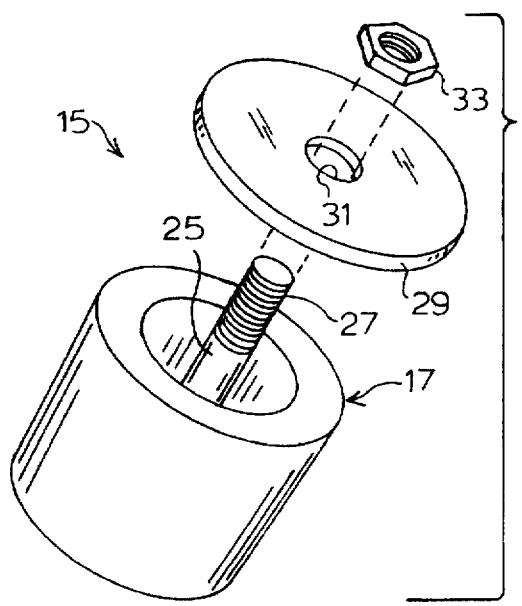
FIG. 1 is a perspective exploded view of the components comprising the improved plug of the invention.
Figure 2:
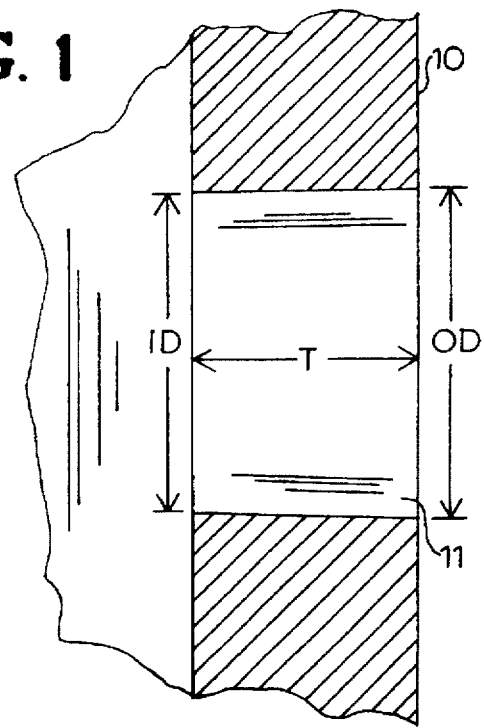
FIG. 2 is a partial cross section view of a typical beer keg wall section showing the tapered hole into which a wooden bung is normally tamped.

Making reference to the drawings, the typical modern beer barrel shaped keg, not shown, in widespread use is made of stainless steel and has an inwardly tapered hole in its side wall 10, a portion of which is depicted in FIG. 2 in which the wall thickness T is typically about 7/10 inches, the outside opening diameter OD is typically about 1 29/32 inches and the inside opening diameter ID is typically about 1 3/4 inches. It is this tapered hole 11 into which a wooden bung, not shown, is normally tamped and with all of the disadvantages previously recited.

Figure 3:
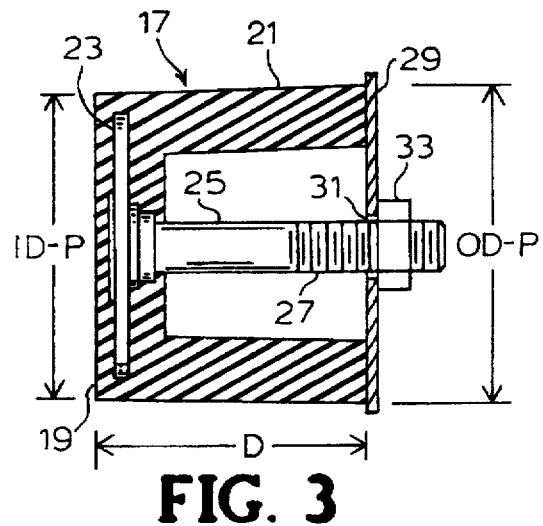
FIG. 3 is a cross section view of the tapered, reusable, and expandable plug of the invention as it appears prior to being expanded.

The improved plug 15 of the invention comprises a partially hollow, integrally molded, conical, cup-like body 17 having a base wall 19 and a sidewall 21. Base wall 19 is made sufficiently thick both to withstand the pressures and stresses imposed during normal service and also so as to permit a relatively rigid metallic round plate 23 to be embedded in base 19 as best seen in FIG. 3. Consideration with regard to the pressure and required flexibility is also taken into account in determining the thickness of sidewall 21. A metal shaft 25 is rigidly and centrally secured to plate 23 as also best seen in FIG. 3 and at its outer end includes a threaded portion 27. A second rigid metallic plate 29 has a central aperture 31 through which the outer end of shaft 25 extends and which is retained by a threaded metal nut 33. However, it is to be noted that a wing nut, cam lock or any other suitable tightening means, can be employed in place of the illustrated nut 33 as a means for drawing the plates 23 and 29 together so as to cause sidewall 21 to expand.

Figure 4:
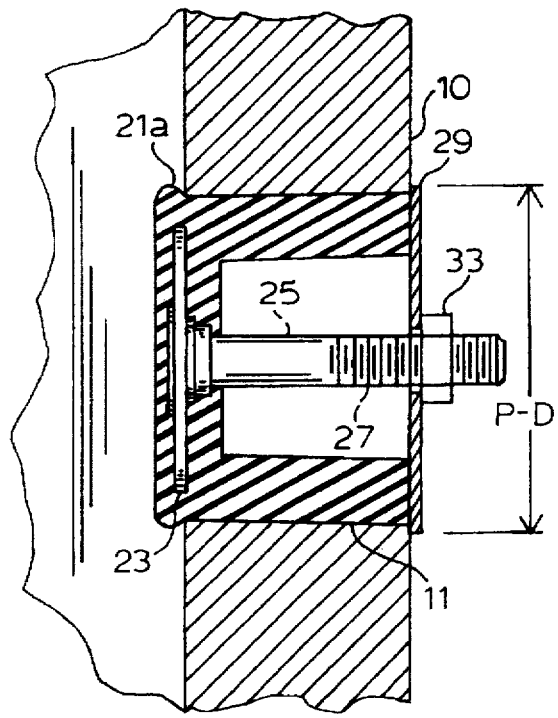
FIG. 4 is a cross section view of the tapered, reusable, and expandable plug of the invention as it appears when snugly fitted within the beer keg wall section hole depicted in FIG. 2 after being expanded by means of a tightening nut and wrench (not shown).

In the embodiment being used for purposes of illustration, the body 17 was molded of a food grade Buna N elastomer material and the overall depth D of body 17 was about 1 1/4 inches; the outer diameter OD-P was about 1 29/32 inches, the inner diameter ID-P was about 1 3/4 inches and the metallic plate 29 had a diameter P-D approximately 1/5 inch greater than the dimension OD-P as best schematically illustrated in FIG. 4. Of course, all of the mentioned dimensions can vary depending on the material used for molding the body 17 and the exact size of the various tightening components.

In use, the tapered plug 15 of the invention is installed in the tapered hole 11 in the beer keg sidewall 10 in a snug, frictionally engaging fit and nut 33 is tightened sufficiently to secure plug 15 within hole 11 and simultaneously cause the portion of plug sidewall 21 within hole 11 as well as a relatively small internally projecting portion 21a to expand so as to substantially prevent any possibility of leakage of either fluid or pressure and of the plug 15 being ejected by reason of pressure developed within the keg.

In summary, these advantages are obtained:

(a) The plug 15, unlike the conventional wooden plug, becomes reusable.

(b) The plug 15 in the illustrated preferred embodiment requires use of a tool to be tightened and untightened thereby substantially preventing or at least substantially deterring improper use of the plug.

(c) A secure fit and essentially liquid and pressure proof seal is obtained.

(d) Bacteria growth is minimized during use and can essentially be destroyed when the plug is heat sterilized between uses.

What is claimed is:

1. A reusable expandable plug for plugging an inwardly tapered round hole formed in a wall of a beer keg and extending between an outer surface and an inner surface, said plug comprising:

(a) an integral cup-like body portion formed of a food grade elastomeric material and having a conical, substantially smooth side wall extending between an outer open end with a first outside diameter and a closed base wall having a second outside diameter that is smaller than said first outside diameter, said cup-like body portion being adapted to frictionally fit within said inwardly tapered hole prior to being expanded and said body portion being of a depth so as to project internally of said hole in said beer keg wall;

(b) a first round rigid plate embedded in said base wall;

(c) a shaft embedded in said base wall and having an inner end secured to said first plate and a threaded outer end extending outwardly of the outer open end of said side wall;

(d) a second round rigid plate having a central aperture adapted to loosely receive said shaft and having an outside diameter at least slightly in excess of the outside diameter of said side wall outer open end such that a peripheral portion of said second plate is able to bear on said keg wall surrounding said hole when said second plate is drawn toward said first plate; and (e) threaded fastener means fitted on said threaded outer end for drawing said second plate toward said first plate when said plug is frictionally fitted within said hole so as to cause said body portion side wall to expand and fictionally grip an inner surface of said hole and to cause a relatively small portion of said sidewall projecting internally of said hole in said beer keg to expand to a diameter greater than an inside diameter of said hole.

2. The reusable plug as claimed in claim 1 wherein said first outside diameter of said plug is substantially equal to a diameter of said outside opening of said hole.

* * * * *